(12) United States Patent
Moehler et al.

(10) Patent No.: US 7,869,123 B2
(45) Date of Patent: Jan. 11, 2011

(54) LASER SCANNING MICROSCOPE WITH HIGH-SPEED DATA PROCESSING

(75) Inventors: Gunter Moehler, Jena (DE); Mirko Liedtke, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 798 days.

(21) Appl. No.: 11/806,458

(22) Filed: May 31, 2007

(65) Prior Publication Data

US 2008/0007820 A1    Jan. 10, 2008

(30) Foreign Application Priority Data

May 31, 2006    (DE) .................. 10 2006 025 445

(51) Int. Cl.
*G02B 21/00* (2006.01)
(52) U.S. Cl. .............. 359/385; 250/559.05; 250/559.06
(58) Field of Classification Search .................... 710/52, 710/58, 65, 71, 300, 104, 120; 359/368, 359/385; 250/200, 206, 215, 458.1, 559.05, 250/559.06
See application file for complete search history.

(56) References Cited

U.S. PATENT DOCUMENTS

| 4,972,258 | A | 11/1990 | Wolf et al. | |
|---|---|---|---|---|
| 7,538,878 | B2 * | 5/2009 | Jung et al. | 356/419 |
| 2003/0137723 | A1 * | 7/2003 | Sander | 359/380 |
| 2004/0064578 | A1 | 4/2004 | Boucher et al. | |
| 2005/0111086 | A1 * | 5/2005 | Knoblich et al. | 359/368 |
| 2005/0111088 | A1 * | 5/2005 | Winterot et al. | 359/368 |

FOREIGN PATENT DOCUMENTS

| EP | 0 527 531 A | 2/1993 |
|---|---|---|
| WO | 2004/036898 A | 4/2004 |
| WO | 2004/104645 A | 12/2004 |

* cited by examiner

*Primary Examiner*—Frank G Font
(74) *Attorney, Agent, or Firm*—Jacobson Holman PLLC

(57) ABSTRACT

Specimen laser-scanning microscope with raster scanning illumination and detector modules, which illuminates and detects a specimen by raster scanning. A real-time control device (device) performs synchronous reading-out with the raster scanning pixel cycle. A data port serially communicates with the device using a bidirectional high-speed data stream and with the resources via a serial, bidirectional high-speed data stream with a data conversion to/from parallel to serial. The high-speed data stream is made up of data packets with data bits and type bits and no additional header or protocol bits. The data bits contain data from/on the resources and the type bits code the type of data. Type information is stored in the resources as well as the device. The type information defines processing functions for data types coded by the type bits, and the resources and/or the device determine the data type using type bits and process data coded in the data bits.

18 Claims, 4 Drawing Sheets

LASER SCANNING MICROSCOPE WITH HIGH-SPEED DATA PROCESSING

BACKGROUND OF THE INVENTION (1) Field of the Invention

The present invention relates to a laser-scanning microscope with sample illumination and detector means, which for the purpose of image acquisition illuminates and detects a sample in a raster scanning manner, with a real-time control device. The control device controls the illumination and detector means for illumination and detection and reads out detection signals, whereby the control device performs control and readout synchronously with a pixel cycle that determines the raster scanning. A data port is connected between the control device and the illumination and detector means and communicates with the control device via a parallel, bidirectional data stream and with the illumination and detector means via a serial, bidirectional high-speed data stream and for this reason performs a conversion of data from parallel into serial or vice versa.

The invention further relates to a laser scanning microscope with sample illumination and detector means, which for purposes of image acquisition illuminate and detect a sample by raster scanning, with a real-time control device, which controls the illumination and detector means for illumination and detection and reads out detection signals. A control device controls the illumination and detection and reads out the detection signals synchronously with a pixel cycle that determines the raster scanning, a data port, connected between the control device and the illumination and detector means, communicates with the control device via a parallel, bidirectional data stream and with the illumination and detector means via a serial, bidirectional high-speed data stream and for this purpose performs a conversion of data from parallel into serial or vice versa.

In a laser scanning microscope of this type, as is offered, for example, by Carl Zeiss AG under the designation LSM 510, image acquisition is carried out by exciting and scanning a sample pixel-by-pixel with excitation or illumination radiation. The image comes about by the intensity of radiation being allocated to the appropriate pixel coordinates and in this way coalescing into an image. Consequently, a pixel-synchronous matching of illumination and detector means, particularly of a scanner, i.e., of a deflecting device is required for illumination and detection in order to gather the information for the image. This implies that the highest data transmission rate possible should be used in the control as well as the readout of it since the speed and volume of the data transmission automatically impacts the length of time that is needed for imaging. Especially with biological samples, it would be desirable, though, to obtain an image as fast as possible, for example, to be able to analyze biological processes. At the same time, this is not only dependent on the data rate, i.e., the product of the data packet size and transmission frequency, but also on the reaction speed at which communication proceeds between the real-time control device and the illumination and detector means. The transmission frequency is a determining factor for this.

Here it must also be borne in mind that not only the control of the deflecting device or the illumination units, e.g., lasers, etc., has to be carried out in a pixel-synchronous way, but rather that today's highly sensitive detector means require equally to a certain extent complex control for readout of the intensity of radiation to be allocated to the pixels. Photomultiplier tubes (PMTs) requiring among other things control of the radiation integration procedures and readout processes are cited as an example. For each pixel, data has to be transmitted to the PMT and data also has to be read out by the PMT. In the final analysis, therefore, an effort is being made to design the data communication so fast that it is not the time determinant in the operation chain. This implies that the data communication should be fast enough in order to process the data traffic needed for this within the minimum time that is needed for detection of a pixel's radiation by the detector (which is called the pixel time).

For high-speed data communication different approaches, which however either need substantial device-related time and effort or have insufficient speed attainment, are familiar in data processing technology.

(2) Summary of the Invention

Therefore, the present invention's basic function is to refine a microscope or technique of the type designated at the beginning in such a way that control of the illumination and detector means is achieved with little time and effort. At the same time, the data rate attained allows for transmitting the data required for each pixel within the pixel time specified on the detector side.

According to the invention this function is performed with a laser-scanning microscope of the designated type, in which the high-speed data stream from the illumination and detector means to the data port is made up of data packets with data bits and type bits and with no additional header or protocol bits. The data bits contain the data on the illumination and detector means and the type bits code the type of data. In the illumination and detector means, if need be, also in the control device, type information is stored that defines processing functions for data types coded by means of the type bits, and when sending, the illumination and detector means set the type bits for the data types in a type assessment. The function is performed further with a technique of the designated type, in which the high-speed data stream between the illumination and detector means and the data port is made up of data packets with data bits and type bits and with no additional header or protocol bits. The data bits contain data from the illumination and detector means and the type bits code the type of data. In the illumination and detector means and the control device, type information is stored that relates to processing functions for data types coded by means of the data bits, and, when sending the illumination and detector means and/or the control device, set the type bits for the data type in a type specification and the control device and/or the illumination and detector means defines the data types using the type bits in a type assessment and process the data coded in the data bits accordingly.

According to the invention header or protocol data, as they are used in usual high-speed data systems (e.g. FireWire or USB) with serial communication and as they usually occur in a normal parallel-to-serial conversion, are dispensed with for the transmission of illumination and detector means. Therefore, a header no longer exists in the data packet as to, e.g., who is sending the data to which address in the bus they are directed, what can be done in case of error handling, etc. From the illumination and detector means to the control device, the data stream is made up exclusively of data bits and type bits, whereas the latter code information on the type of data stored in the data bits. Each module attached to the link carrying the data stream thus makes a type bit specification when delivering the data. The type bits are distinguishable from header bits of normal communications data streams by the fact that they contain no general information, but rather merely provide information on the processing of the data in the data bits which are to be subjected to in combination with type indications, which are authorized at the sending and receiving end, and the type assessment based on this at the receiving end.

The high-speed data stream consequently is adjusted in a microscope-specific way and as a rule requires stored type information both on the receiving and sending end as to how the data are to be arranged or processed. This type of data communication, on the one hand, manages to eliminate any redundant information and thereby increases the effective useful rate for the data to be transmitted. On the other hand, it simplifies the data-related time and effort on the sending and receiving end, since the type specification can be designed very simply with the senders or recipients using type bits. This immediately gives the recipients the necessary information as to whether and, if need be, how they have to process data bits, or whether not at all. At the same time the senders do not have to administer and communicate address data.

The invention-related conversion of the parallel, bidirectional data stream into a serial, bidirectional high-speed data stream, which is adapted to the requirements in the laser scanning microscope, further simplifies cabling in the microscope, since serial data cables need less space. In addition, a standard computer can be used for the real-time control device, and complex or costly special interfaces on the part of the real-time control device are left out. The conversion into/ from the microscope-specific high-speed data stream first takes place at the data port that acts as the microscope's port.

The invention-related concept for communication from the illumination and detector means to the control device is indeed particularly advantageous; however, a use in the reverse channel, which is located away from the control device, is equally possible.

The utilization of high-speed data transmission with type bits has the added advantage that every data packet made up of data bits and type bits can now simultaneously be sent out or also received by multiple illumination and detector means' positions if for example the type assessment for a type of data reveals that it is relevant at different locations, e.g., by different illumination and detector means' units. With traditional address-based data communications, a simultaneous broadcasting of a data packet from and/or to different units would be impossible and instead of that multiple data packets would have to be furnished with different addresses and transmission delayed via the high-speed data stream. It is easily understandable that the useful data transmission rate achieved then would be reduced a number of times.

Usually laser-scanning microscopes are broken down into individual modules, which act together in the illumination and scanning. Various illumination modules, which can be integrated into a microscope and provide radiation of various wavelengths, are an example of this. It is also a familiar practice to equip laser-scanning microscopes with different detector modules, which have, e.g., different spectral analysis capabilities. For such a modular design, it is desirable to provide a data manager to communicate with the individual modules and to connect to the individual modules according to the serial high-speed data stream, since the individual modules must be operated in coordination with each other, however, for the most part individually do not need the full data rate for communication; this data rate is only necessary in the interaction of all the modules on the part of a real-time control device.

It is naturally advantageous for this design to make up the individual serial streams (which, e.g., can be designed pursuant to familiar LVDS data transmission) of data bits and types bits as well and dispensing with additional header bits between the individual modules and the data manager, since otherwise address and header information would have to be created and also transmitted by the individual modules. It will be more practical for the data manager to have the appropriate connectors for the individual modules. The data manager continues to work better with a fixed allocation scheme, by which it feeds the individual modules' data packets into the high-speed data stream. A time-consuming analysis of the individual data streams in the data manager or one requiring a processing unit is not necessary then, yet the real-time control device or the data port has to take into consideration the consolidation of the high-speed data stream from the individual data streams that is permanently set in the data manager, i.e., the individual data streams' data packets will be arranged by the data port or the real-time control device accordingly in the high-speed data stream in such a way that the allocation in the data manager is reflected in the structure of the high-speed data stream.

Since a modularly designed laser scanning microscope is only seldom changed or in the case of redesign fixed connection regulations can be preset, this limitation does not constitute a hindrance. In addition, if need be, or as an alternative at the data port and/or in the real-time control device, a setting mechanism (e.g., as software or hardware device) can be provided, through which it and/or they are communicated to the individual modules that are bound to the individual data stream connectors so that the data port or the control device knows how the data packets in the high-speed data stream are composed of the individual data streams.

For this reason, for a modular microscope it is advantageously provided that the illumination and detector means have multiple individual modules, which interact during the illumination and scanning, a data manager communicating with the individual modules and merging the high-speed data stream from individual serial streams of the individual modules and leading it out of the data port is connected between the data port and the individual modules of the illumination and detector means. The individual serial data streams between the data manager and individual modules are also made up of data bits and type bits and dispensing with additional header bits, the type information is stored in the individual modules and the individual modules perform the type assessment and the processing of the data coded in the data bits. Of course, this concept can also be used in direction of communication from the real-time control to the individual modules.

The data manager's work is especially simple if the individual data streams are carrying data packets that are a fraction as long as the high-speed data stream's data packets. Preferably, the individual data streams' data packets are half as long as those of the high-speed data stream. Then the data manager simply composes each high-speed data stream data packet from two halves that are derived from two individual data streams. The data packet frequency of each individual data stream is then equal in size to that of the high-speed data stream, however with half the packet length. Half the frequency of the high-speed data stream is sufficient for an individual module, the data manager can make up each packet of the high-speed data stream alternatively separately from two individual data streams so that overall four individual data streams are used, which in each case have half the frequency of the high-speed data stream and half the packet length. The one high-speed data stream is then simply composed of four individual data streams. This is naturally also possible with simultaneous sending out (broadcast) of the individual data packets.

In the same way, naturally, scaling is possible, i.e., two different data ports or a double data port can be provided which convert(s) the parallel data stream from the real-time data control device into two high-speed data streams. This can be practical in very complex laser-scanning microscopes.

If it would be desirable to address numerous individual modules, it can be even more advantageous that multiple individual modules are connected to a single common data link and utilize this data link as a type of a data bus, whereas the type assessment in turn implicitly defines which individual module or which individual modules process or in the case of transmission send out a data packet's data that are coded in the data bits.

In laser-scanning microscopes, the illumination and detector means also have actuators, which for the most part have a call back function to the control unit and which can be suited or set for operation without any impact occurring in the pixel cycle or shift being necessary, aside from elements to be controlled in a pixel-synchronous way. The pinhole shift mechanical data before the detectors are examples of such actuators. Other examples are the setting of drivers for acoustic-optical filters in illumination units, the drives for color distribution switchers or shutters, and safety screens or the like. All such components do have to have a certain setting during operation of the laser-scanning microscope, yet an activation and/or call back report occurring in the pixel cycle is unnecessary. Usually, such actuators have so far been controlled with slow working data busses, e.g., what is called a CAN bus, which implies that in traditional microscopes a (non-pixel-synchronous) slower (CAN) bus has to still be carried through the entire device along with the high-speed data communication.

In the invention-related laser-scanning microscope, it is now possible to make separate settings data bus networking of the entire microscope unnecessary by embedding into the high-speed data stream with a certain type coding the settings data or callback data, which for example are added to the units according to the CAN bus protocol just mentioned, and by having the illumination and detector means extract from the high-speed data stream the settings data or the data port, the data manager or the control unit the reverse data using the type coding carried out by the respective transmitter and leading them to the actuators or processing them.

The slow and not necessarily pixel-synchronous settings data, therefore, are fed into the high-speed data stream from the real-time control device or the data port and extracted on the receiving end, i.e. in the illumination and detector means. The opposite applies to reverse data. For this reason, it is provided in a preferable refinement of the microscope that the illumination and detector means have settings elements, which can be controlled when the microscope is in operation asynchronously to the pixel cycle, whereas the control device makes the suitable settings data for the settings elements, the settings elements are embedded, e.g., with a certain type coding or address into the high-speed data stream and the illumination and detector means extract the settings data and lead them to the settings elements. Alternatively or in addition this is carried out in the reverse channel.

The CAN bus that was already mentioned is an efficient implementation for the forwarding of settings data to the settings elements. For this reason, it is provided for in a refinement that at least one individual module will make available a CAN bus for at least one settings element allocated to the individual module or provided for in it and will convert the settings data and/or reverse data into and/or from the CAN bus data by means of a converting element.

In order to test the settings elements, which are controlled, e.g., via the CAN bus, usually full operation of the microscope is necessary, since all actuators are connected to a common CAN bus system. The invention-related design, in which the settings data are converted from and/or into the high-speed data stream from the illumination and detector means, i.e. usually from the individual modules, now allows for a design, in which the individual modules or individual components of the illumination-detector means can be tested individually. For this a diagnostic connector to the CAN bus is provided for in the individual module through which a direct CAN bus control of the settings element is possible for diagnostic and checking purposes. The diagnostic connector is therefore located between the converting element that converts the settings data from and/or into the high-speed data stream and the settings element. In that way it is possible to check the functionality of a settings element individually without having the rest of the microscope in operation.

A more extensive check is possible if the converting element, which makes available, e.g., the CAN bus data, also performs a reverse conversion of the settings data into the serial data stream. Then the interaction between the control device and the individual module or its settings element can also be checked, since the control device obtains values fed in or presetting done by means of a reverse conversion at the diagnostic connector. The forward and reverse conversion in each case can be provided for, not only, individually, but also in combination.

The use of individual data streams, as already mentioned, allows for a simple linking of different modules, whereas at the same time an unnecessarily high data rate is avoided on individual modules and the overall transmission rate of the high-speed data stream is distributed accordingly over the individual modules. Now the data manager can be designed in such a way that it will make an individual data stream available for each individual module. Alternatively, a option is presented whereby at least one of the individual modules has an outlet, to which it transfers the individual data stream introduced and assessed by it and through which an additional individual module is supplied.

This individual data stream, therefore, is used as a data bus, whereas the length of the chain essentially is only limited by the transit time of the signals up to the last individual module and the data rate made available by the individual data stream. Such an individual data stream bus can be utilized particularly well if individual data modules are combined in it, which modules require varying data rates in both communication directions. Therefore, individual modules with a high upload rate will be more beneficially combined with individual modules that need a high download rate. In turn, naturally settings can be made at the control device or at the data port and consideration can be given to how the individual modules are linked to the individual data streams. In this way, the data manager simply can execute a segmentation and/or combination of the high-speed data stream into and/or out of the individual data stream(s). In other words, the high-speed data stream in its composition reflects the segmentation and/or combination of the individual data streams' data packets that is carried out in the data manager and how the individual modules are linked onto the individual data streams, i.e., which one of the individual data streams a certain individual module will receive.

As far as the invention here is described with reference to a mechanism or a technique, this applies accordingly to the invention-related technique or mechanism, even if this matching of mechanism and technique characteristics should not be expressly mentioned.

BRIEF DESCRIPTION OF THE DRAWINGS

The invention will be depicted more closely below with reference to drawings. The drawings show in.

Figure 1:
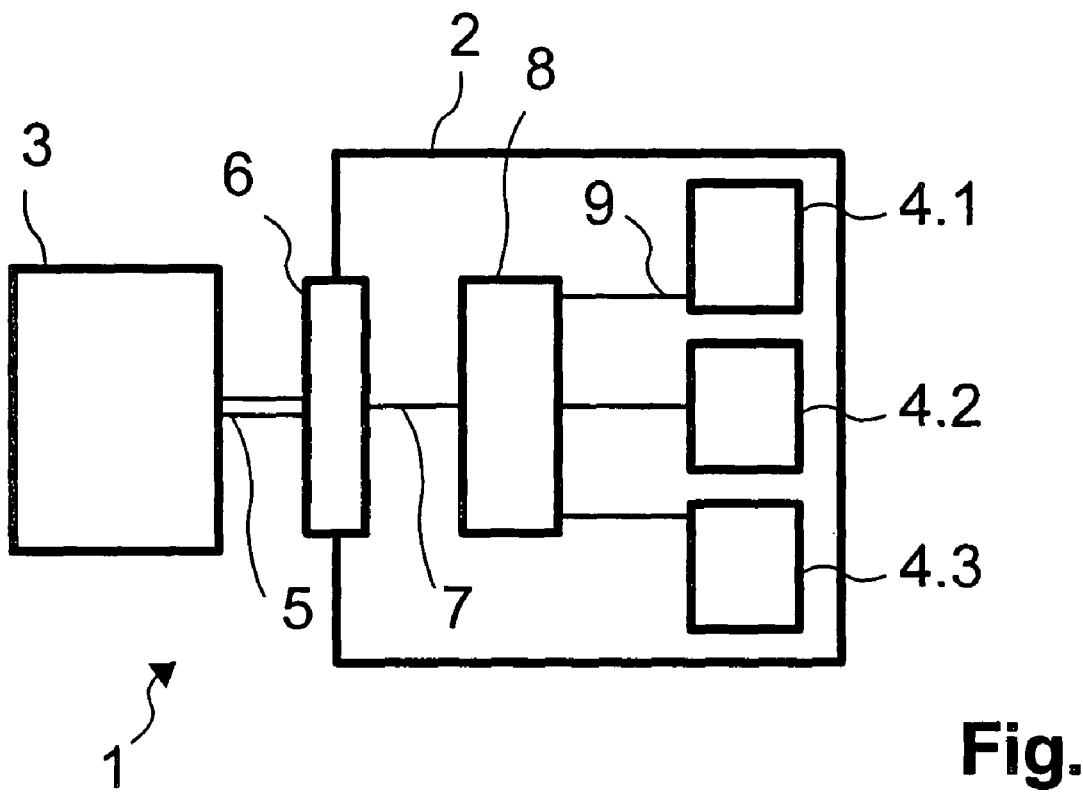
FIG. 1 is a schematic representation of a laser-scanning microscope in relation to control and data communication.

Furthermore, the attached Table 1 shows an example of data conversion of the microscope in FIG. 1.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The schematic drawing in FIG. 1 shows a laser-scanning microscope system 1 that essentially is made up of a modular microscope 2 and a control device 3. This microscope 2 represents a laser-scanning microscope known based on its principle of microscopy, with which a sample is scanned by means of raster scanning illumination as well as raster scanning detection. The microscope 2 for this reason is provided with appropriate modules 4.1, 4.2 and 4.3 (they are taken together also provided with the reference number 4), which can be configured, for example, as a scanner module 4.1, as a detector module 4.2 and as a laser module 4.3. The modules (the number depicted in FIG. 1 is merely to be taken as an example) can be controlled by the control device 3, whereby for the imaging a certain control situation has to exist for each pixel of an image in order that the necessary, coordinated operation of the modules is achieved. The control device 3 for this reason passes the appropriate control signals via a parallel data link 5, which can be configured for example as a familiar PCI bus, on to the microscope 2 and receives the appropriate data from the microscope 2. The parallel data link 5 on the microscope side is connected to a port 6, which converts the parallel data stream into a serial data stream and passes it on via a serial high-speed data link 7. This data link carries a serial high-speed data stream, in which the data delivered via the parallel data link 5 are carried by data packets as a serial sequence. The structure of these data packets and the mode of operation of this port 6 will be explained hereinafter.

The functionality described below as well as the corresponding configuration is not limited to one direction of communication. Either of the two can only be implemented in the direction toward the modules, in the direction away from the modules or in both directions. A variation described below possibly only in one direction consequently can also be implemented in the opposite direction or in both directions.

The serial data packets that are carried via the data link 7 are forwarded from a data manager 8 to three serial module data links 9 in the embodiment. The data manager 8 segments the high-speed data stream into individual data streams, which are then fed into the serial module data links 9

The control by the control device 3 has to coordinate the modules' work in virtually real time. This may be exemplified by means of the schematic drawing in FIG. 2. It can be seen in FIG. 2 that that illumination radiation 12 provided by the laser module 4.3, which excites florescence, e.g., in the sample, is directed to a sample field 10 through the scanner module 4.1, whereby the sample field 10 is scanned by raster scanning of different pixels 11. The radiation (e.g. fluorescence radiation) 13 that is caused and to be detected at an appointed position of the scanner module 4.1 by the illumination with an irradiation from the laser module 4.3 of one of the pixels 11 of the sample field 10 is in turn imaged by the scanner module 4.1 and then divided on a splitter 14 to the detector module 4.2 that verifies the radiation accordingly. An illumination beam path therefore exists between the laser module 4.3 upstream of the splitter 14 and the scanner module 4.1, and the radiation to be detected is directed through a detection beam path from the pixel 11, through the scanner module 4.1 and the splitter 14 to the detector module 4.2 in a detection beam path and verified at the detector.

It is self-explanatory that operation and also readout of data from module 4 must be carried out in an inter-coordinated way for each of the pixels 11. This control device 3 makes sure of this accordingly. For example, first the scanner module 4.1 is set to the coordinates of the pixel 11. Then the laser module 4.3 is activated accordingly so that an illumination of the pixel takes place. At the same time or after a lag in time, a read out of the detected radiation is performed at the detector module 4.2. The radiation intensity detected at that time is assigned to the pixel coordinates, stored accordingly and integrated into an image after completely raster scanning all pixels 11 in the sample field 10.

Figure 2:
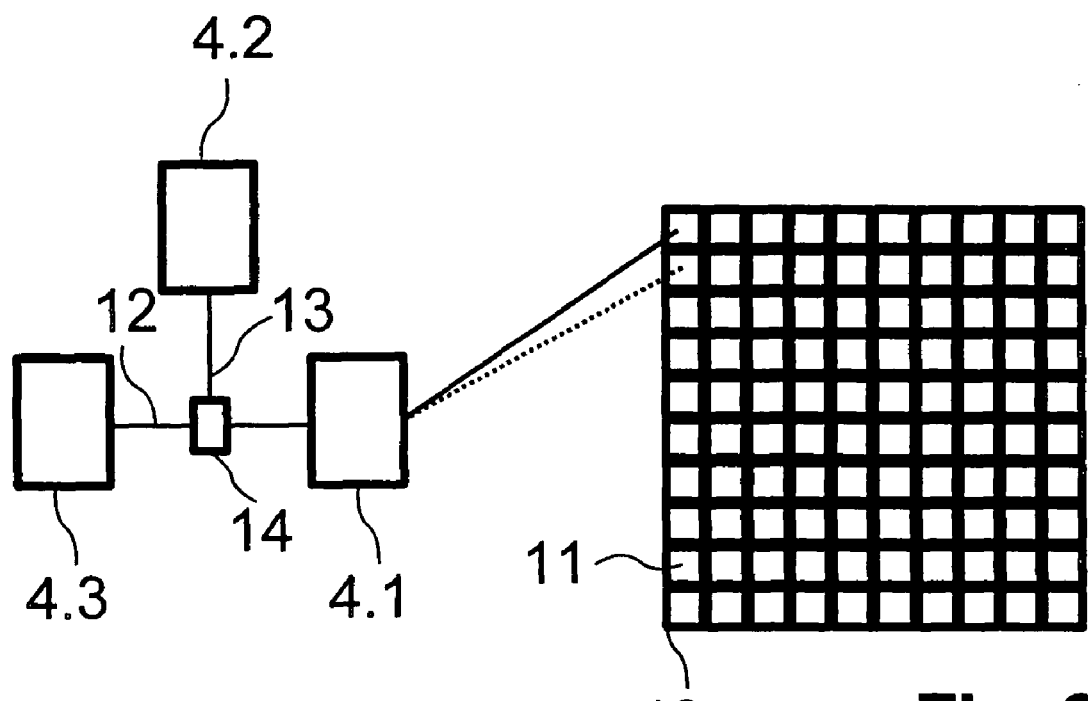
FIG. 2 is a schematic representation of the laser-scanning microscope of FIG. 1 in relation to deflecting radiation in the microscope.

Of course this description as well as the representation in FIG. 2 is extremely simplified; still other controls are necessary, for instance focus adjustments, settings on a sample table, etc. But it is obvious from the description that the illumination and detector means, as they for example can be implemented by means of the individual modules 4, have to be operated inter-coordinated in a pixel-synchronous manner that includes both the control of the modules as well as possibly the reading out of data from the modules (forward channel). What is essential here, as was mentioned, is that several modules 4 have been provided in the microscope and they, as the modules 4.1-4.3, have to be operated in a pixel-synchronous manner in relation to each other, so that a certain adjustment of the modules (reverse channel) or read out of the modules is carried out with every pixel for the creation and detection of radiation intensity. The reading out or control here can change from pixel to pixel so that upon transition from one pixel to the next, as for example was already represented in FIG. 2 by means of the solid or the dotted line onto the sample field 10, a further input of control values or read out of values is necessary at the modules by the control device 3.

The conversion of the data carried out in the microscope system 1 by means of the port 6 has various advantages. On the one hand, the control device 3 can now transmit the data over a traditional parallel data link 5. Consequently, economical components can be utilized for the control device 3, possibly even a store bought PC or notebook could be considered. The conversion of these data delivered in a parallel fashion into a serial high-speed data link 7 has the advantage that a simple cabling is possible in the microscope. Furthermore, a serial data stream lends itself far more easily to segmentation into the individual data streams through the serial module data links 9 or combined therefrom, as will be further described below.

What is essential in the data that are carried over the serial high-speed data link 7 and then over the serial module data links 9 is that data packets are used in at least in one direction and transmit no protocol. Therefore, no header exists which receives for instance information on the sender, the receiver, address data, error handling specifications, time indications, etc. Instead, the data packets then contain exclusively data bits and type bits, whereby the data bits reproduce control data in the reverse channel, measurement data, or location report data in the forward channel and the type bits provide an indication of the type of data bits. In this way the serial high-speed data stream that runs over the data link 7 contains data packets, which combine two 16-bit packets each into a 32-bit packet, whereby the four more bits for the type coding (in bits 32 through 35) are transmitted in addition to the 2 times 16-bit raw data.

Since the data communication from modules 4 to the control mechanism 3 contains no address information, the combination of the high-speed data stream has to take into consideration the segmentation into the serial individual data streams on the serial module data links 9, particularly which individual modules 4 are connected to the respective serial module data links.

For this reason, the data port 6 can accomplish the conversion. Alternatively, the data manager 8 can feed the initiating packets of the serial module data links 9 into or in the high-speed data stream according to a fixed plan. For instance every data packet from the link to the module 4.1 can become a first element of the high-speed data stream, every data packet from the link to the module 4.2 a second and every data packet from the link to the module 4.3 a third one. This similarly applies to the reverse channel. It can be provided for this variant which individual module 4 can be connected to which connector on the data manager 8, or it will be stored in the control device 3 which module 4 is attached onto which connector of the data manager.

On the other hand, it is possible that the data manager takes into consideration the structure of the high-speed data stream when it is forwarding to the individual module 4 and performs a variable conversion of the data packets.

Figure 3:
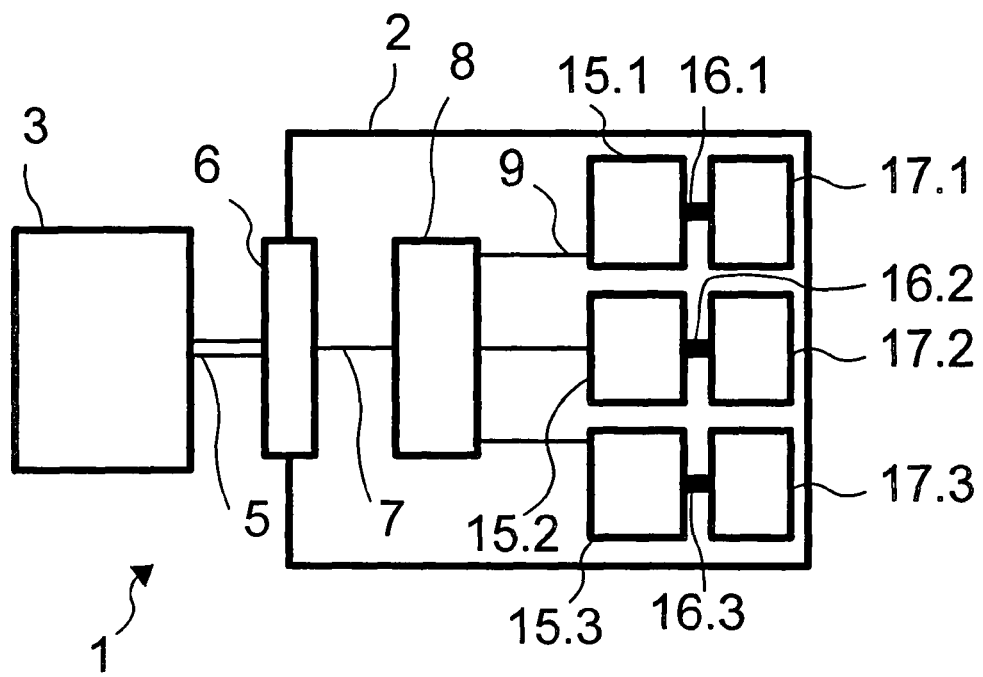
FIG. 3 is a schematic representation similar to that of FIG. 1 with a more detailed reproduction of the configuration of the components of the microscope.

The use of the data packets of individual modules 4 over the serial module data links 9 is carried out with the configuration shown in FIG. 3 for the individual modules 4 in the following way (the explanation is carried out here, without any restriction, for the reverse channel): in the design, as it is shown in FIG. 3, every individual module 4 is essentially subdivided into two units. The data packets of modules 4.1-4.3 are respectively gathered by a module operation switch 15.1-15.3 (when all taken together they are referenced under the reference number 15) and accordingly converted into control signals for the module. The module operation switches 15, which for instance can each have an appropriate CPU, a ROM, a RAM as well as an ASIC, therefore, perform the type assessment and convert the data contained in the data packets' data bits, depending on the specification in the type bits, possibly into the corresponding control processes.

The control will be carried out then over an operation link 16.1, 16.2, 16.3 (taken together under the reference number 16). Each operation link 16 leads to the corresponding module element 17.1, 17.2, 17.3, (taken together accessed as module elements 17), which carry out the appropriate function in the laser-scanning microscope 2. In the embodiment in FIG. 3 the module element 17.1 includes two galvanometer mirrors positioned at right angles to each other, the module element 17.2 a PMT and the module element 17.3 an illumination laser. In the forward channel the type assessment is replaced by the type big specification.

The corresponding module operation switches 15 provide the respective module elements 17 via the operation links 16 with the appropriate supply voltages, control signals or read out the appropriate location report and measurement value signals. Every module operation switch 15 for this reason with the type assessment in the reverse channel checks whether the type bits indicate that the following data packets' data bits have to be converted from the module operation switch 15 into a corresponding control. At the same time, depending on the module in the reverse channel, the module operation switch 15 can create a corresponding data packet, e.g. with measurement values, by combining a corresponding coding (type bits) with appropriate values (data bits) in a data packet and leading it back over the serial module data link 9 to the data manager 8 and from there over the serial high-speed data link 7 and the port 6 on the parallel data link to the control device 3. This functionality will now be described for the reverse and the forward channel for the example of the scanner module.

For the complete raster scanning of a pixel 11 the control device 3 specifies via the parallel data line 5 that the scanner mirror should assume a certain position. This position specification is converted from the port 6 data packet of the serial high-speed data stream via the serial high-speed data link 7. Thus at least one data packet runs over the serial high-speed data link 7, which packet contains type bits (e.g. four type bits) that indicate that the following data bits that reproduce the position (coordinates) to be assumed by the galvanometer mirror. Upon segmentation of the high-speed data stream in the data manager 9 this data packet runs in the reverse channel over the serial module data link 9 to the module operation switch 15.1. The module operation position 15.1 initiates a type assessment of all data packets, which are supplied to it over its serial module data link 9. In this assessment it recognizes in the type bits of the said data packet that new coordinates are specified for the galvanometer mirror.

The module operation switch 15.1 then provides appropriate voltage signals over the operation data link 16.1 to the module element 17.1, i.e. the galvanometer mirror. The galvanometer mirrors thereupon assume the desired position. Since in the embodiment the galvanometer mirrors have a position report, the module operation switch 15.1 recognizes through the operation link 16.1 that the galvanometer mirror is in the desired position and thereupon creates a data packet for the forward channel, the data bits of which code the position the galvanometer mirror achieved and provides these data bits with the appropriate type bits, which are provided for in system 1 for this type of information and provides these data bits with the appropriate type bits, which are provided for in system 1 for this type of information. This report goes over the serial module data link 9, the data manager 8, the high-speed data link 7, the port 6 as well as the parallel data link 5 and makes its way to the control device 3, which thereby knows that the galvanometer mirrors, i.e. the scanner module 4.1 are adjusted to the coordinates of the desired pixel 11. In the next step the control device 3 then effects delivery of illumination laser radiation, in turn by carrying out a corresponding reverse channel control via the parallel data link 5 so that in the end the module operation switch 15.3 contains a data packet, whose data bits code the details of the illumination radiation to be delivered, for instance the frequency, pulse start and pulse duration of a laser radiation pulse, which is recognized by the module operation switch 15.3 in the type bits of the data packet.

A status report on delivery of the desired laser pulse is carried out possibly similarly as with the scanner module described in the forward channel. In a similar manner the control device 3 causes the detector module to operate, during which in the forward channel the PMT in the module element 17.2 accordingly is also controlled via the operation link 16.2 and measurement values are delivered back and in the reverse channel corresponding data packets arrive at the module operation switch 15.2.

Figure 4A:
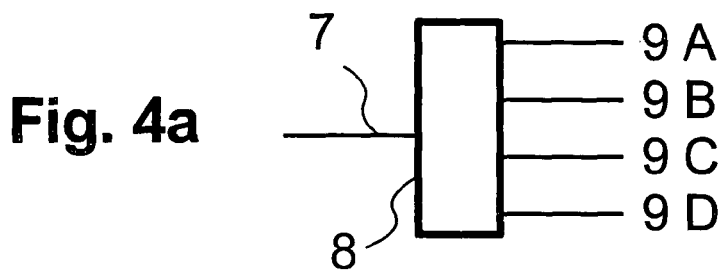
FIG. 4*a* is a more detailed schematic representation of a data manager in the microscope of FIGS. 1 and 3.
Figure 4B:
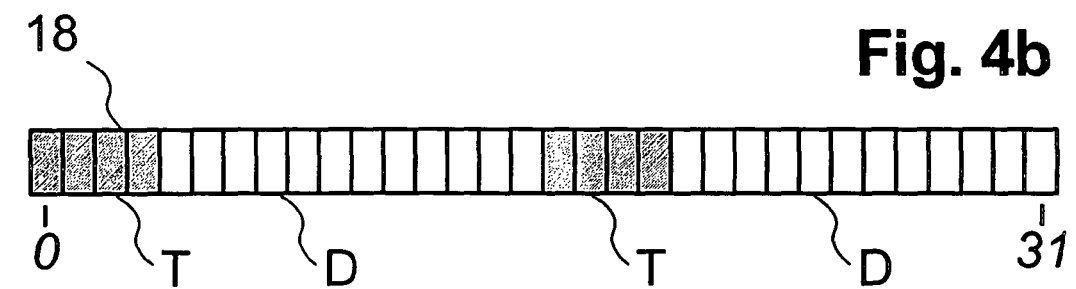
FIGS. 4*b*, 4*c* and 5 illustrate the apportionment of data packets by the data manager of FIG. 4*a*.
Figure 4C:
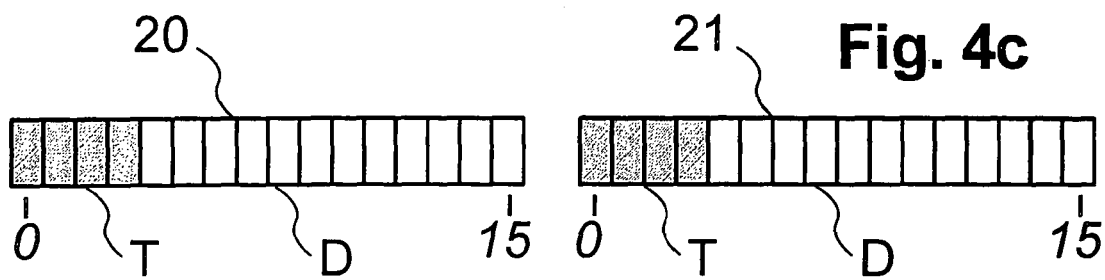

In the embodiment in FIGS. 1 and 3, the data manager 8, as mentioned, performs a fixed combination and/or segmentation of the data stream carried over the serial high-speed data link 7. For instance, as is shown in FIG. 4a, the data manager accomplishes a feed from two serial module data links 9A and 9B, according to the plan as it is shown in the FIGS. 4b and 4c. Naturally, a combination or segmentation can also be carried out from and into more than two module data links. In FIG. 4a for this reason two additional module data links 9C and 9D are shown. FIG. 4b shows a high-speed data packet (hereinafter HS data packet for short) of the high-speed data stream that is designed as a 32-bit word. The data manager 8 segments this 32-bit word into two 16-bit words, which thereby constitute two data packets 20 and 21. These data packets are transmitted for instance with signals in accordance with the LVDS standard, as it is described, e.g., in the LVDS Owner's Manual, 3$^{rd}$ edition, 2004, National Semiconductor, USA. The first data packet 20 is allocated to the first serial module data links 9A, the second data packet 21 to the second module data link 9B. Either by means of the control device 3 or by means of the port 6 it is seen to that the configuration of the 32-bit HS data packet 18 takes into consideration this permanently set segmentation in the data manager 8.

An equally possible structure, in which type bits are only used in the forward channel, is shown in the enclosed Table 1.

Each data packet 20, 21 has type bits T and data bits D. The 32-bit HS data packet 18 contains, e.g., starting from the bit no. 0 as well as from the bit no. 16 the type bits T, to which data bits D connect, which run up to bit no. 15 or bit no. 31 respectively. In the variant shown in FIG. 4b four respective type bits T are provided, which are drawn in the figure hatched. By means of the segmentation into two data packets 20 and 21, then in the data manager 8 each of the 16-bit words at the beginning has (e.g. four) type bits T, to which the (e.g. 12) data bits D connect.

Figure 5:
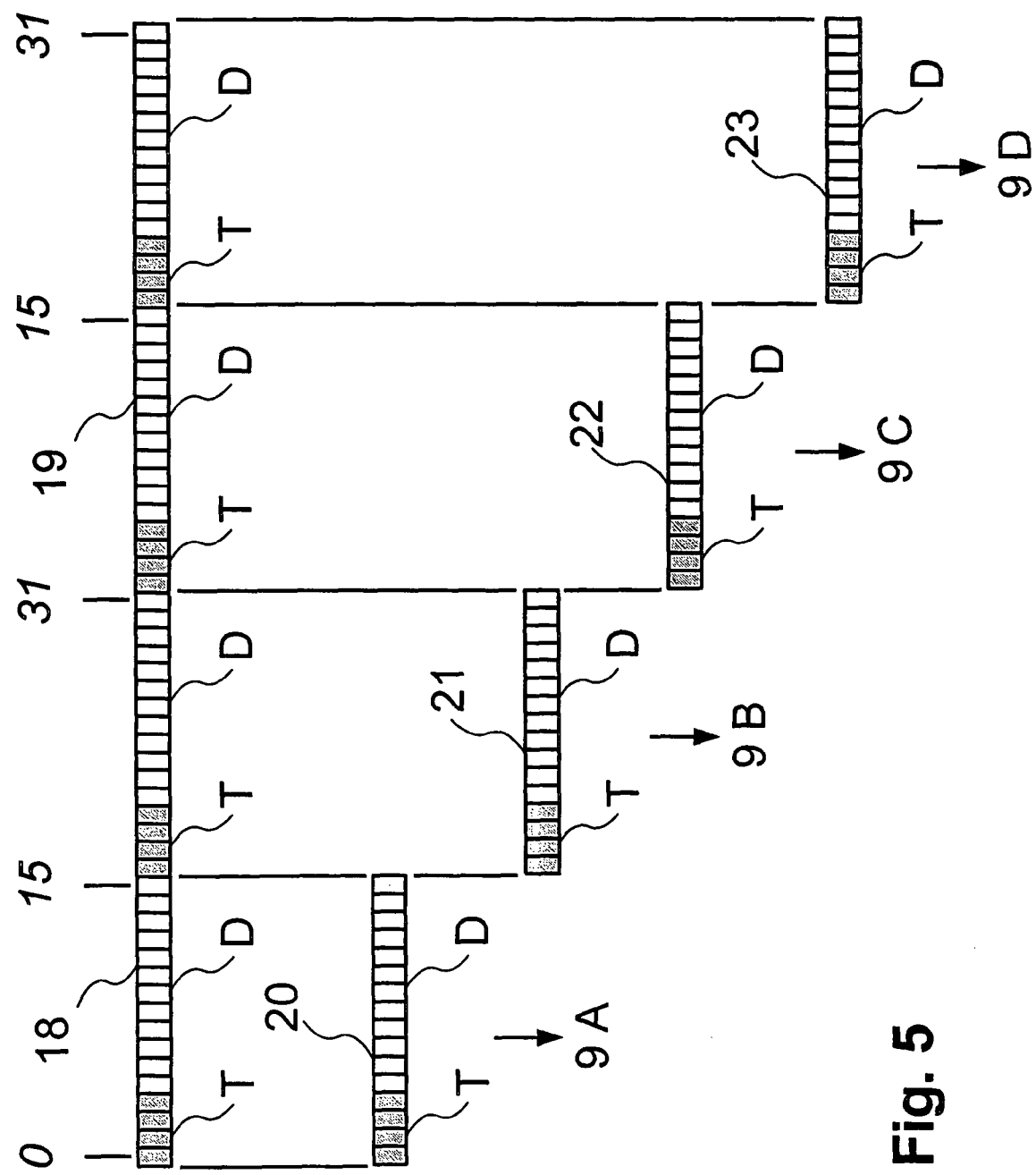

FIG. 5 shows an exemplary case in which the data manager 8 also includes the module data links 9C and 9D. Here two subsequent 32-bit long HS data packets 18 and 19 of the high-speed data stream are divided into a total of four 16-bit data packets 20, 21, 22 and 23, which are allocated to the module data links 9A, 9B, 9C and 9D. That principle corresponds to the one described using FIGS. 4b and 4c, with the difference being that two subsequent HS data packets 18 and 19 and brought in. Therefore, the first half of a first HS data packet 18 is allocated to the serial module data link 9A, the second half of the first HS data packet 18 is allocated to the serial module data link 9B, the first half of the second HS data packet 19 to the module data link 9C and the second half of the second HS data packet 19 to the serial module data link 9D.

Figure 6:
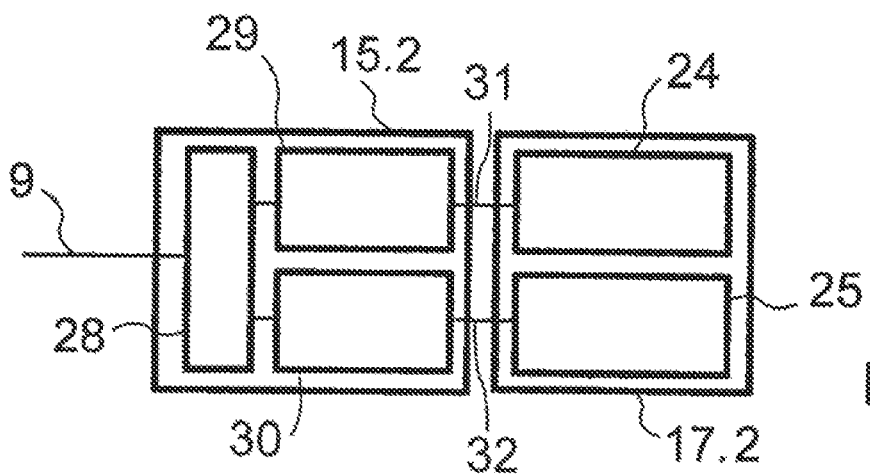
FIG. 6 is a schematic diagram of an individual module of the microscope in FIGS. 1 and 3 in relation to the control of a settings element.

FIG. 6 schematically shows in detail an exemplary configuration of an individual module, here of a detector. The module operation switch 15.2 of the detector as well as the module element 17.2 is depicted. As can be seen, the module element 17.2 has a schematically drawn in PMT 24 as well as pinhole shift mechanical data 25, which a pinhole upstream to the PMT 24 shifts in relation to situation and size. This pinhole is of essential significance for the confocal illustration of the laser-scanning microscope 2. The position and size of the pinhole 25 have to have certain values during the operation of the microscope 2. A shift during the complete raster scanning of the sample field 2, i.e., a pixel-specific adjustment is on the other hand as a rule not necessary. Accordingly, the module operation switch 15.2 is also equipped with two sub-modules, a PMT operation module 29 as well as a CAN bus module 30. The PMT operation module performs the control and reading out of the PMT 24 that was already mentioned and for this reason is linked to the PMT 24 via an HS link 31. The CAN bus module 30 is connected via a CAN bus 32 to the pinhole shift mechanical data 25 and directs this with CAN data pursuant the familiar CAN bus. The module operation switch 15.2 therefore has an operation module, which has to work in a pixel-synchronous manner and as a rule in the high frequency range, that is to say the PMT operation module 29, as well as a slowly working bus module, which controls the pinhole adjustment with non-pixel-synchronous settings data; in the embodiment this is carried out via a CAN bus.

Both the pixel-asynchronous data as well as the pixel-synchronous high frequency data are communicated with the module operation switch 15.2 via the serial module data link 9. Not only are pixel-synchronous (high frequency) data included in the data packets, which flow above the data stream of the serial module data link 9 and which also are carried in the serial high-speed data stream of the serial high-speed data link 7, but rather also pixel-asynchronous settings data are embedded; the latter are used at least in one direction with a certain type recognition also a traditional address indication. In the opposite direction instead of type recognition the corresponding segmentation or combination of these different data types in the individual module is produced by a splitter 28, which on the one hand is linked to the serial module data link 9 and on the other hand forwards which the high frequency or settings data forward to the PMT operation module 29 or the CAN bus module 30. For this it performs a type evaluation or assessment. Naturally, this configuration described using the detector module is in principle possible in an embodiment of the invention for additional or all detection and illumination means.

This embodiment has the advantage that the control device 3 can control not only those parts of the illumination and detector means in real time, which need pixel-synchronous control or reading out, but rather also part of the microscope 2, which can only be in a certain position when in operation, yet do not have to be adjusted in the pixel cycle. At the same time, the control of these settings elements with traditional (slow) bus systems, as result from the CAN bus, without a separate cabling of the microscope 2 having to be provided for according to this bus. Thus such a bus interface can itself be dispensed with in the control device 3 and also in the microscope 2.

Figure 7:
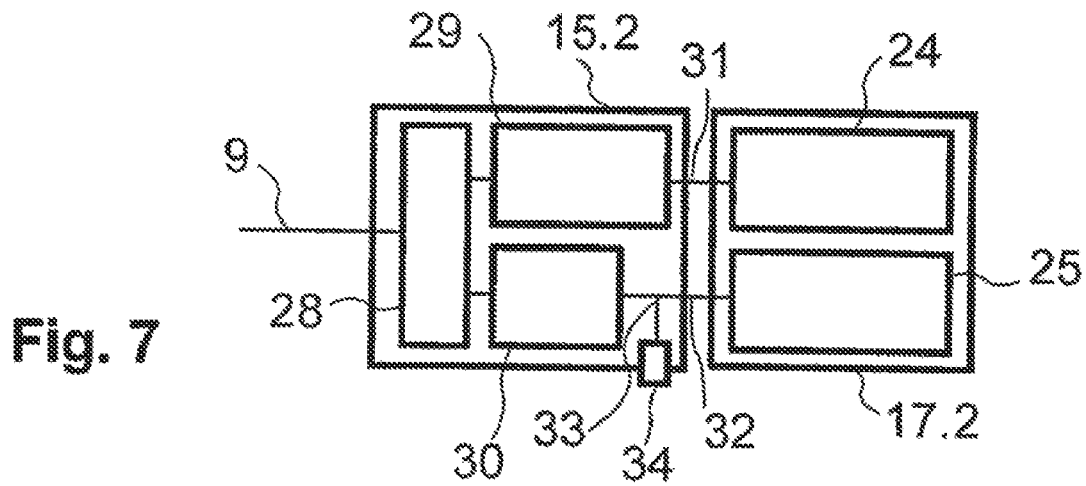
FIG. 7 is a schematic representation similar to FIG. 6 of a further configuration of an individual module.

FIG. 7 shows a further configuration of an individual module controlled via a serial module data link 9 pursuant to FIG.

6. The configuration essentially corresponds to that in FIG. 6, so that elements described there do not have to be explained once again. The refinement consists in the fact that in the module operation switch 15.2 on the CAN bus 32 a CAN bus branch connection 33 is provided, which empties into a externally accessible CAN bus connector 34. This connector 34 can either be provided directly on the module operation switch 15.2, or also on a suitable other place on the microscope 2, particularly an arrangement is possible on a diagnostic adapter board.

The proper functioning of the pinhole adjustment mechanical data will now be checked in this simple way by feeding in the appropriate CAN bus signals from a diagnostics device on the connector 34. The mode of operation of the corresponding module can also be checked by reading along of the signals coming in at the CAN bus connector 34, which the CAN bus module 30 provides via the CAN bus 32 for the pinhole adjustment mechanical data 25. Finally, it can also be provided for in a repeated refinement that the CAN bus module 30 on the connector 34 reconverts CAN data fed in and feeds in via the splitter 28 into the module data stream of the serial module data link 9. Thus a reverse diagnostics is also possible.

Figure 8:
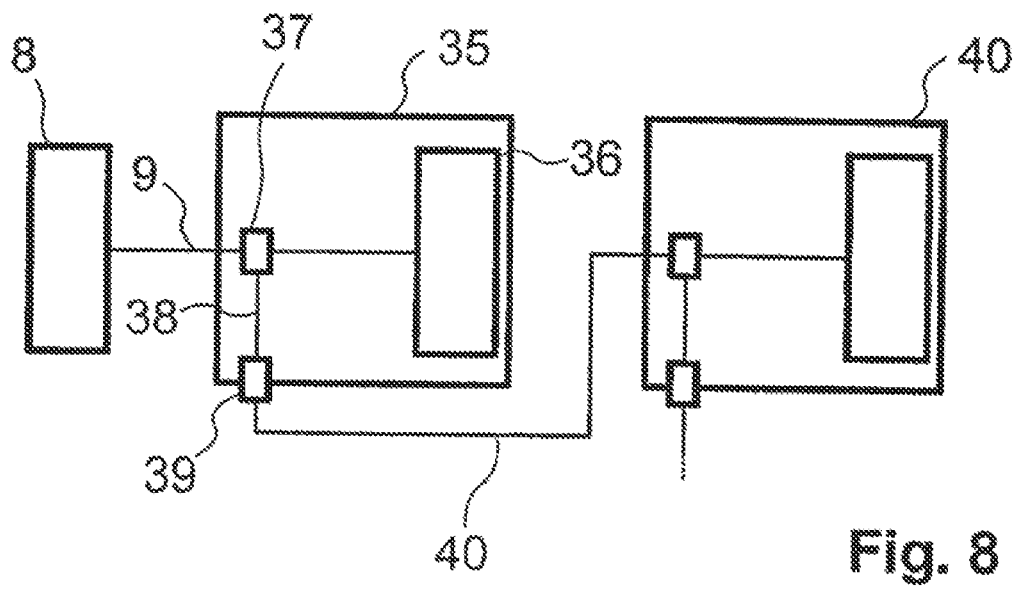
FIG. 8 is a schematic diagram of several individual modules, which are connected in a bus-like way to the data manager in FIG. 1 or 3 in the microscope.

In the embodiments described, the data manager 8 carries out a combination or segmentation of the high-speed data stream of the high-speed data link 7 out from and into individual data streams, which are linked to serial individual module links 9, for instance the links 9A, 9B and possible 9C and 9D. At the same time, case constellations were explained, in which each individual module has an independent serial module data link. This, however, is not absolutely necessary. The data manager 8 for instance can also use the module data link 9 as a bus. For this reason on the corresponding individual modules, which are shown by way of example as individual modules 35 and 40 in FIG. 8, on the entrance side a branching node 37 is provided that directs all data packets supplied through the module data link 9 to a forwarding branch 38 or funnels incoming data packets to the serial module data link 9. The forwarding branch 38 ends in a bus connector 39 to which an additional individual module 40, which essentially corresponds to the individual module 35, is connected by means of a bus link 40.

Consequently, several individual modes are divided into a serial module data link in the manner of a bus, whereby in turn the type specification or type assessment, which is performed within the module 35 or 40 by an assessment unit 36, defines which data the data bits contain from which it follows (implicitly) whether the respective module processes a data packet. Such an assessment unit 36 is in principle provided for in each individual module either as an independent element or its function is performed by another component.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

TABLE 1

In the direction of modules (reverse channel)

| 36 BITS | 4 type bits | high word | low word |
| --- | --- | --- | --- |
| 1 HS packet | empty | 11 bit address | 16 bit date | becomes

| 16 bit | in the first packet | first packet | second packet |
| --- | --- | --- | --- |
| 2 LVDS packets | 4 type bits: empty | 11 bit address | 16 bit date |

In the direction of the control meter (forward channel)

| 16 bit | in the first packet | first packet | second packet |
| --- | --- | --- | --- |
| 2 LVDS packets | 4 type bits | 11 bit dispatcher | 16 bit date | is combined in the high-speed stream into:

| 36 bits | 4 type bits | high word | low word |
| --- | --- | --- | --- |
| 1 HS packet | copied type bits | 11 bit dispatched | 16 bit date |

TABLE 1-continued or alternatively in the case of heavy data traffic: 4 LVDS packets become 1 HS packet:
(the dispatcher is processed in the data manager)

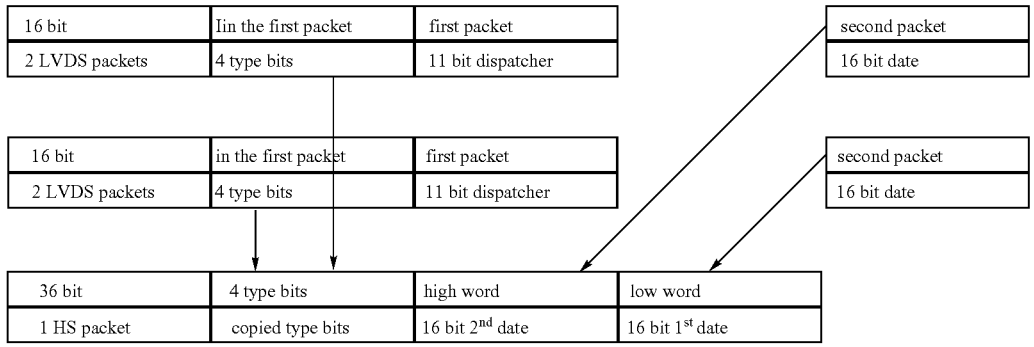

What claimed is:

1. A laser-scanning microscope for viewing a specimen, the microscope comprising:
    illumination and detector means for providing illumination radiation for illuminating a sample field, for raster scanning different pixels of the sample field with the illumination radiation, for acquiring an image of the raster scanned pixels, and for imaging detection radiation emitted by the sample field as a result of the illumination of the pixels;
    a control device for activating the laser module, controlling the scanner module, and controlling reading out the detection signals from the detector module in a synchronous manner in relation to the pixel cycle that determines the raster scanning;
    a data port connected between the control device and the illumination and detector means, the data port communicating with the control device via a parallel, bidirectional data stream and with the illumination and detector means via a serial, bidirectional high-speed data stream in order to perform a data conversion from parallel into serial and vice versa;
    the high-speed data stream between the illumination and detector means and the data port being made up of data packets with data bits and type bits and without additional header and protocol bits, the data bits containing data from the illumination and detector means and the type bits coding the type of data, and
    storing means for storing type information in the illumination and detector means, wherein the type information relates to processing functions for data types coded by means of the type bits so that the illumination and detector means and the control device determine the data type using the type bits and process data coded in the data bits.

2. The microscope according to claim 1, wherein the illumination and detector means has multiple individual modules, that work together during illumination and raster scanning;
    wherein the microscope further comprises a data manager that communicates with the individual modules and combines the serial individual data streams into the high-speed data stream, the data manager being connected between the data port and the individual modules of the illumination and detector means;
    wherein the serial individual data streams from the individual modules are made up of the data bits and the type bits and no additional header bits; and
    wherein the type information is stored in the data manager, the data port or the control device, and wherein the type bits are subjected to a type assessment for determining the data type.

3. The microscope according to claim 2, wherein the individual data streams contain data packets that are approximately half as long as the data packets of the high-speed data stream.

4. The microscope according to claim 2, further comprising:
    a common data link connected to several of the individual modules and used as a data bus to carry the high-speed data stream, with the type bits determining which individual module processes or sends data.

5. The microscope according to claim 2, wherein the illumination and detector means has settings elements, which can be read out or activated when the microscope is being operated in an asynchronous manner in relation to the pixel cycle, wherein corresponding settings bits are exchanged between the settings elements and the control device, and the settings data are embedded into the high-speed data stream.

6. The microscope according to claim 5, further comprising:
    a CAN bus and a converting element, wherein at least one of the individual modules extracts the settings data from the serial data stream, makes the CAN bus available for at least one settings element that is allocated to the settings element, and converts the settings data extracted by means of the converting element into CAN bus data.

7. The microscope according to claim 6, further comprising:
    a diagnosis connector on the CAN bus, the diagnosis connector for carrying out, through the CAN bus, activation of the settings element for diagnostic purposes.

8. The microscope according to claim 7, wherein the converting element on the diagnostic connector converts CAN bus data into the serial data stream.

9. The microscope according to claim 8, wherein the converting element provides the back converted data with type bits.

10. The microscope according to claim 2, further comprising an additional individual module, and wherein at least one individual module supplied with one of the individual data streams has an outlet, to which the individual data stream is forwarded and at which the additional individual module taps the individual data stream so that the individual data stream is used as a type of a data bus.

11. The microscope according to claim 1, wherein the control device operates in real-time.

12. A method for data communication in a laser-scanning microscope, the method comprising the steps of:
  illuminating a specimen while the specimen is being raster scanned and scan detected using illumination and detecting means;
  controlling and reading out the illuminating and detecting means with a control device using a serial, bidirectional high-speed data stream in a pixel-synchronous manner, wherein the high-speed data stream between the illumination and detector means and a data port is made up of data packets with data bits and type bits and with no additional header or protocol bits; and
  storing type information in the illuminating and detecting means, wherein the type information relates to processing functions for data types coded by means of the type bits so that the illuminating and detecting means and the control device determine the data type using the type bits and process data coded in the data bits.

13. The method according to claim 12, wherein for the illuminating and detecting means several individual modules are used and the serial high-speed data stream is segmented into several individual data streams for the individual modules, wherein the individual data streams in each case are made up of data bits and type bits and with no additional header bits.

14. The method according to claim 13, wherein the individual data streams contain data packets that are approximately half as long as the data packets of the high-speed data stream.

15. The method according to claim 12, wherein several individual modules are connected to a common individual data link and utilize it as a data bus to carry the high-speed data stream, wherein the type bits implicitly define, which individual module processes or sends data coded in the data bits.

16. The method according to claim 13, further comprising the step of connecting a single bus-type data link to several of the individual modules.

17. The method according to claim 12, wherein the illuminating and detecting means include actuators, and wherein the method further comprises the step of at least one of controlling and reading out the actuators by means of settings data in a asynchronous manner, wherein the settings data are embedded in the high-speed data stream.

18. A laser-scanning microscope for viewing a specimen, the microscope comprising:
  a laser module for providing illumination radiation for illuminating a sample field;
  a scanner module for raster scanning different pixels of a sample field with the illumination radiation, and for imaging detection radiation emitted by the sample field as a result of the illumination of the pixels;
  a detector module for detecting the detection radiation imaged by the scanner module and outputting corresponding detection signals;
  a control device for activating the laser module, controlling the scanner module, and reading out the detection signals from the detector module in a synchronous manner in relation to the pixel cycle that determines the raster scanning;
  a data port connected between the control device and the laser module, the scanner module, and the detector module, the data port communicating with the control device via a parallel, bidirectional data stream and with the laser module, the scanner module, and the detector module via a serial, bidirectional high-speed data stream in order to perform a data conversion from parallel into serial and vice versa;
  the high-speed data stream between the data port and the laser module, the scanner module, and the detector module being made up of data packets with data bits and type bits and without additional header and protocol bits, the data bits containing data from laser module, the scanner module, and the detector module and the type bits coding the type of data, and
  storing means for storing type information in the laser module, the scanner module, and the detector module, wherein the type information relates to processing functions for data types coded by means of the type bits so that laser module, the scanner module, and the detector module and the control device determine the data type using the type bits and process data coded in the data bits.

* * * * *